(12) United States Patent
Yang et al.

(10) Patent No.: US 9,319,468 B2
(45) Date of Patent: Apr. 19, 2016

(54) INFORMATION PROCESSING APPARATUS AND INFORMATION PROCESSING METHOD

(71) Applicant: Lenovo (Beijing) Co., Ltd., Beijing (CN)

(72) Inventors: Yuanqing Yang, Beijing (CN); Hongguang Wang, Beijing (CN); Lei Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/474,845

(22) Filed: Sep. 2, 2014

(65) Prior Publication Data
US 2015/0189021 A1    Jul. 2, 2015

(30) Foreign Application Priority Data
Dec. 27, 2013   (CN) .......................... 2013 1 0741213

(51) Int. Cl.
| | |
|---|---|
| H04L 29/08 | (2006.01) |
| H04N 7/14 | (2006.01) |
| H04L 29/06 | (2006.01) |
| G06F 3/14 | (2006.01) |

(52) U.S. Cl.
CPC ................ *H04L 67/141* (2013.01); *G06F 3/14* (2013.01); *H04L 67/38* (2013.01); *H04N 7/141* (2013.01); *G09G 2350/00* (2013.01); *G09G 2370/022* (2013.01)

(58) Field of Classification Search
CPC .............................. H04L 67/141; H04N 7/141
USPC .......... 345/89, 173, 596, 156; 348/14.07, 96, 348/559; 358/1.9; 382/128; 701/210; 705/26.8; 707/622, 758; 715/798
See application file for complete search history.

(56) References Cited

U.S. PATENT DOCUMENTS

| | | | | |
|---|---|---|---|---|
| 6,094,218 | A * | 7/2000 | Suzuki ............... | H04N 1/00249 348/96 |
| 6,636,271 | B1 * | 10/2003 | Megeid ................ | H04N 5/4401 348/559 |
| 6,731,400 | B1 * | 5/2004 | Nakamura ............. | G06K 15/00 358/1.9 |
| 6,825,830 | B1 * | 11/2004 | Kanesaka ............. | G08B 5/228 345/156 |
| 7,027,916 | B2 * | 4/2006 | Furukawa ............ | G01C 21/367 701/455 |
| 7,206,696 | B2 * | 4/2007 | Furukawa ............ | G01C 21/367 340/995.12 |

(Continued)

*Primary Examiner* — Gerald Gauthier
(74) *Attorney, Agent, or Firm* — Brinks Gilson & Lione; G. Peter Nichols

(57) ABSTRACT

An information processing method and an information processing apparatus are disclosed. The information processing method is applied to a first electronic device, and includes establishing a communication link between the first electronic device and a second electronic device; determining whether a predetermined display condition is satisfied; when the predetermined display condition is satisfied, displaying a first communication interface to be used for communicating with the second electronic device, wherein the first communication interface can include a first region and a second region that are not totally identical, the first region includes a first sub-region for displaying first information acquired by the first electronic device and/or a second sub-region for displaying second information acquired by the second electronic device, in case of presence of shared information, the second region is provided to display the shared information.

20 Claims, 2 Drawing Sheets

(56) References Cited

U.S. PATENT DOCUMENTS

| | | | |
|---|---|---|---|
| 8,010,488 B2 * | 8/2011 | Ushiyama | H04N 21/23103 707/622 |
| 8,433,623 B2 * | 4/2013 | Lawrence | G06Q 30/0631 705/26.8 |
| 8,736,561 B2 * | 5/2014 | Anzures | G06F 3/04883 345/173 |
| 8,843,848 B2 * | 9/2014 | Adachi | G06F 3/0481 715/798 |
| 2008/0068320 A1 * | 3/2008 | Kim | G09G 3/36 345/89 |
| 2009/0167781 A1 * | 7/2009 | Nakata | G09G 5/39 345/596 |
| 2010/0179960 A1 * | 7/2010 | Shigeeda | G06F 17/30946 707/758 |
| 2013/0147731 A1 * | 6/2013 | Adachi | G06F 3/0484 345/173 |
| 2014/0140593 A1 * | 5/2014 | Park | G06F 19/345 382/128 |
| 2015/0189021 A1 * | 7/2015 | Yang | H04N 7/141 348/14.07 |
| 2015/0286280 A1 * | 10/2015 | Yang | G06F 3/017 345/156 |

\* cited by examiner

INFORMATION PROCESSING APPARATUS AND INFORMATION PROCESSING METHOD

This application claims priority to Chinese patent application No. 201310741213.5 filed on Dec. 27, 2013, the entire contents of which are incorporated herein by reference.

BACKGROUND

The present disclosure relates to the field of information processing, and more particularly, to an information processing apparatus and an information processing method.

Currently, network communication performed by electronic devices like mobile phones, tablet computers, personal computers and so on, via a network like Internet, has become more and more widespread. A communication process is proposed, i.e., while a first electronic device transmits information (e.g., a first video) acquired by itself to a second electronic device, and information (e.g., a second video) acquired by the second electronic device and received from the counterpart is outputted locally, shared content data like picture, dynamic picture, video, PPT or the like is also shared between the first electronic device and the second electronic device. In this case, in addition to achieving video communication between the first electronic device and the second electronic device, it is also possible to share other content data (e.g., sharing travel photo, work PPT etc.) between the two, thereby enhancing the functions and the applied scenarios of video communication.

However, since, in addition to transmitting/receiving the first video and the second video between the first electronic device and the second electronic device, shared content data is also transmitted during the period of performing the above video communication, there is a higher requirement for bandwidth of the communication link between the first electronic device and the second electronic device, if the bandwidth of the communication link between the two is insufficient, serious impact will be caused on the shared content data transmitted between the first electronic device and the second electronic device, which will significantly reduces user experience.

SUMMARY

In order to solve the above-described technical problem, according to an aspect of the present disclosure, there is provided an information processing method applied to a first electronic device, the information processing method comprising: establishing a communication link between the first electronic device and a second electronic device; determining whether a predetermined display condition is satisfied; when the predetermined display condition is satisfied, displaying a first communication interface to be used for communicating with the second electronic device, wherein the first communication interface can include a first region and a second region that are not totally identical, the first region includes a first sub-region for displaying first information acquired by the first electronic device and/or a second sub-region for displaying second information acquired by the second electronic device, in case of presence of shared information, the second region is provided to display the shared information, at least part of the shared information is displayed on both the first electronic device and the second electronic device simultaneously; during a period of displaying the second region, performing data amount reduction processing at least on the first information that needs to be transmitted within a predetermined time period during the period of displaying the second region, so as to generate third information and transfer the third information to the second electronic device, wherein data amount of the third information is smaller than that of the corresponding first information.

Furthermore, according to an embodiment of the present disclosure, wherein the step of performing data amount reduction processing at least on the first information that needs to be transmitted within a predetermined time period during the period of displaying the second region further comprises: during the period of displaying the second region, determining whether there is a start or update for display of the shared information; when it is determined that there is a start or update for display of the shared information, determining the predetermined time period based on the start or update for display of the shared information.

Furthermore, according to an embodiment of the present disclosure, wherein the step of determining the predetermined time period based on the start or update for display of the shared information further comprises: when there is the start or update for display of the shared information, determining whether a predetermined data amount reduction condition is satisfied; and if the predetermined data amount reduction condition is satisfied, then determining that the update time of transmitting the first information and the shared information to the second electronic device is the predetermined time period.

Furthermore, according to an embodiment of the present disclosure, wherein the step of determining whether a predetermined data amount reduction condition is satisfied further comprises: detecting status of the communication link and acquiring bandwidth information associated with bandwidth of the communication link; and determining whether the predetermined data amount reduction condition is satisfied based at least on the bandwidth information.

Furthermore, according to an embodiment of the present disclosure, wherein if the bandwidth information indicates that the bandwidth of the communication link is higher than a first threshold value, then it is determined that the predetermined data amount reduction condition is not satisfied, and data amount reduction processing is not performed on the first information (and the update of the shared information); if the bandwidth information indicates that the bandwidth of the communication link is less than or equal to the first threshold value and higher than a second threshold value, then it is determined that the predetermined data amount reduction condition is satisfied, a first data amount reduction processing is performed on the first information based on the first data amount reduction condition; or if the bandwidth information indicates that the bandwidth of the communication link is less than the second threshold value, then it is determined that a second data amount reduction condition is satisfied, a second data amount reduction processing is performed on the first information based on the second data amount reduction condition, and a data reduction degree of the second data amount reduction processing is greater than that of the first data amount reduction processing.

Furthermore, according to an embodiment of the present disclosure, wherein the first information is video data acquired in real-time by the first electronic device.

Furthermore, according to an embodiment of the present disclosure, wherein the data amount reduction processing includes at least one of: lowering resolution of the first information to generate the third information having a resolution lower than that of the first information; selecting at least one specific representative frame in the first information within a preset unit time period as the third information and generating a first display control instruction, the third information and the first display control information being transmitted to the second electronic device, the first display control instruction being for causing the third information to be displayed on the second electronic device within the preset unit time period; and selecting a portion of representative video frames in the first information within a preset unit time period as the third information and generating a second display control instruction, the third information and the second display control instruction being transmitted to the second electronic device, the second display control instruction being for causing the third information to be played on a loop within the preset unit time period.

Furthermore, according to an embodiment of the present disclosure, wherein the data amount reduction processing comprises: processing the first information to generate first medium information that contains first voice information of the first user as acquired by the first electronic device and first feature information representative of a feature of the first user, wherein the first feature information is for modifying first display information to generate second display information, and the second display information and the first voice information are transmitted to the second electronic device, so as to output the second display information and the first voice information at the second electronic device.

Furthermore, according to an embodiment of the present disclosure, wherein the first display information is virtual display information of the first user and generated by steps of: obtaining third display information, which is reference virtual display information; obtaining adjustment information at the first electronic device, the adjustment information is generated by that the first electronic device detects a feature of the first user, or generated by that the first electronic device receives an instruction from the first user; and generating the first display information based on the third display information and the adjustment information.

Furthermore, according to an embodiment of the present disclosure, wherein if it is determined that a first data amount of the first information and a second data amount of update of the shared information to be transmitted within a unit time period is less than or equal to the bandwidth of the communication link indicated by the bandwidth information, then it is determined that the preset data amount reduction condition is not satisfied, and data amount reduction processing is not performed on the first information and the update of the shared information; or if it is determined that a first data amount of the first information and a second data amount of update of the shared information to be transmitted within a unit time period is larger than the bandwidth of the communication link indicated by the bandwidth information, then it is determined that the preset data amount reduction condition is satisfied, data amount reduction processing is performed on the first information.

Further, according to another embodiment of the present disclosure, there is provided an information processing apparatus applied to a first electronic device, the information processing apparatus comprising: a communication unit configured to establish a communication link between the first electronic device and a second electronic device; a display unit configured to display image; a processing unit configured to perform preset processing based on a preset instruction, wherein the processing unit is configured to: determine whether a predetermined display condition is satisfied; when the predetermined display condition is satisfied, display, via the display unit, a first communication interface to be used for communicating with the second electronic device, wherein the first communication interface can include a first region and a second region that are not totally identical, the first region includes a first sub-region for displaying first information acquired by the first electronic device and/or a second sub-region for displaying second information acquired by the second electronic device, in case of presence of shared information, the second region is provided to display the shared information, at least part of the shared information is displayed on both the first electronic device and the second electronic device simultaneously; and during a period of displaying the second region, perform data amount reduction processing at least on the first information that needs to be transmitted within a predetermined time period during the period of displaying the second region, so as to generate third information and transfer the third information to the second electronic device, wherein data amount of the third information is smaller than that of the corresponding first information.

Furthermore, according to an embodiment of the present disclosure, wherein during the period of displaying the second region, the processing unit further determines whether there is a start or update for display of the shared information; and when it is determined that there is a start or update for display of the shared information, the processing unit determines the predetermined time period based on the start or update for display of the shared information.

Furthermore, according to an embodiment of the present disclosure, wherein when there is the start or update for display of the shared information, the processing unit determines whether a predetermined data amount reduction condition is satisfied; if the predetermined data amount reduction condition is satisfied, then the processing unit determines that the update time of transmitting the first information and the shared information to the second electronic device is the predetermined time period.

Furthermore, according to an embodiment of the present disclosure, wherein when determining whether a predetermined data amount reduction condition is satisfied, the processing unit detects status of the communication link and acquires bandwidth information associated with bandwidth of the communication link; and the processing unit determines whether the predetermined data amount reduction condition is satisfied based at least on the bandwidth information.

Furthermore, according to an embodiment of the present disclosure, wherein if the bandwidth information indicates that the bandwidth of the communication link is higher than a first threshold value, then the processing unit determines that the predetermined data amount reduction condition is not satisfied, and data amount reduction processing is not performed on the first information and the update of the shared information; if the bandwidth information indicates that the bandwidth of the communication link is less than or equal to the first threshold value and higher than a second threshold value, then the processing unit determines that the predetermined data amount reduction condition is satisfied, a first data amount reduction processing is performed on the first information based on the first data amount reduction condition; or if the bandwidth information indicates that the bandwidth of the communication link is less than the second threshold value, then the processing unit determines that a second data amount reduction condition is satisfied, a second data amount reduction processing is performed on the first information based on the second data amount reduction condition, and a data reduction degree of the second data amount reduction processing is greater than that of the first data amount reduction processing.

Furthermore, according to an embodiment of the present disclosure, wherein the first information is video data acquired in real-time by the first electronic device.

Furthermore, according to an embodiment of the present disclosure, wherein the data amount reduction processing includes at least one of: lowering resolution of the first information to generate the third information having a resolution lower than that of the first information; selecting at least one specific representative frame in the first information within a preset unit time period as the third information and generating a first display control instruction, the third information and the first display control information being transmitted to the second electronic device, the first display control instruction being for causing the third information to be displayed on the second electronic device within the preset unit time period; and selecting a portion of representative video frames in the first information within a preset unit time period as the third information and generating a second display control instruction, the third information and the second display control instruction being transmitted to the second electronic device, the second display control instruction being for causing the third information to be played on a loop within the preset unit time period.

Furthermore, according to an embodiment of the present disclosure, wherein the data amount reduction processing comprises: processing the first information to generate first medium information that contains first voice information of the first user as acquired by the first electronic device and first feature information representative of a feature of the first user, wherein the first feature information is for modifying first display information to generate second display information, and the second display information and the first voice information are transmitted to the second electronic device, so as to output the second display information and the first voice information at the second electronic device.

Furthermore, according to an embodiment of the present disclosure, wherein the first display information is virtual display information of the first user and generated by steps of: obtaining third display information, which is reference virtual display information; obtaining adjustment information at the first electronic device, the adjustment information is generated by that the first electronic device detects a feature of the first user, or generated by that the first electronic device receives an instruction from the first user; and generating the first display information based on the third display information and the adjustment information.

Furthermore, according to an embodiment of the present disclosure, wherein if it is determined that a first data amount of the first information to be transmitted within a unit time period and a second data amount of update of the shared information is less than or equal to the bandwidth of the communication link indicated by the bandwidth information, then the processing unit determines that the preset data amount reduction condition is not satisfied, and data amount reduction processing is not performed on the first information and the update of the shared information; or if it is determined that a first data amount of the first information to be transmitted within a unit time period and a second data amount of update of the shared information is larger than the bandwidth of the communication link indicated by the bandwidth information, then the processing unit determines that the preset data amount reduction condition is satisfied, data amount reduction processing is performed on the first information.

DETAILED DESCRIPTION

Figure 1:
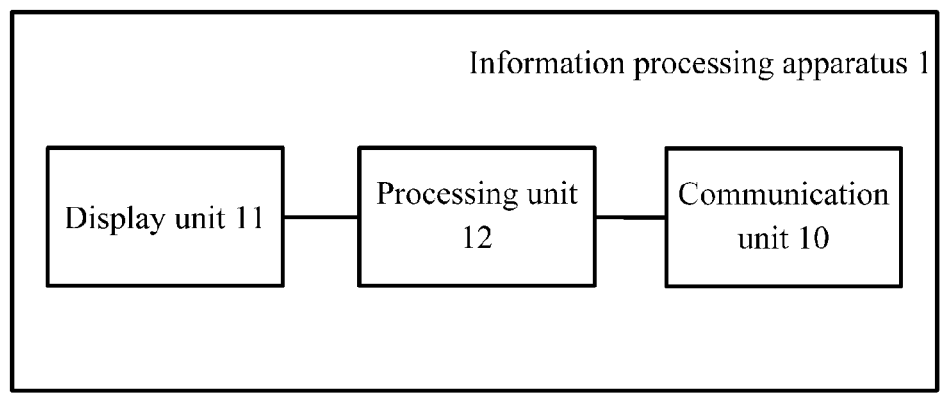
FIG. 1 is a schematic block diagram illustrating an information processing apparatus according to an embodiment of the present disclosure.

Respective embodiments of the present disclosure will be described in detail with reference to the accompanying drawings. Herein, it should be noted that, in the drawings, the same reference signs are given for components of substantially the same or similar structures and functions, and repeated description thereof will be omitted.

FIG. 1 is a schematic block diagram illustrating an information processing apparatus according to an embodiment of the present disclosure. Herein, the information processing apparatus according to an exemplary embodiment of the present disclosure may be applied to an electronic device like smart phone, tablet PC, laptop, PC or smart TV etc. (for the sake of distinction, hereinafter the electronic device is referred to as the first electronic device). Herein, the first electronic device further includes, not limited to, I/O component like touch screen, keyboard, speaker, camera etc. as well as other functional components like GPS, gyro, gravity sensor, proximity sensor etc., in addition to the information processing apparatus according to the present disclosure.

As shown in FIG. 1, the information processing apparatus according to an embodiment of the present disclosure may comprise a communication unit 10, a display unit 11, and a processing unit 12.

The communication unit 10 may be implemented by any communication module, and may establish a communication link with other electronic devices outside the first electronic device (for the sake of distinction, hereinafter referred to as the second electronic device) and perform communication therewith. Herein, the second electronic device may have structures and functions similar to the first electronic device (e.g., it comprises the information processing apparatus according to the present disclosure), therefore no more details repeated herein.

The display unit 11 may be implemented by any display screen, and may display an interface according to images or video signals and so on provided thereto.

The processing unit 12 may be implemented by any processor, microprocessor etc., and may perform preset processing based on an instruction set in advance in the first electronic device (e.g., ROM).

According to an embodiment of the present disclosure, the processing unit 12 may determine whether a predetermined display condition is satisfied when a communication link is established between the first electronic device and the second electronic device. When the predetermined display condition is satisfied, the processing unit 12 displays, via the display unit 11, a first communication interface to be used for communicating with the second electronic device. Herein the first communication interface may include a first region and a second region that are not totally identical, the first region includes a first sub-region for displaying first information acquired by the first electronic device and/or a second sub-region for displaying second information acquired by the second electronic device. Herein, in case of presence of shared information, the second region is provided to display the shared information, at least part of the shared information is displayed on both the first electronic device and the second electronic device simultaneously.

Specifically, when the first electronic device requests to communicate with the second electronic device and a user of the second electronic device (hereinafter referred to as the second user) confirms or when the second electronic device requests to communicate with the first electronic device and a user of the first electronic device (hereinafter referred to as the first user) confirms, a communication link is established between the first electronic device and the second electronic device. For example, when the processing unit 12 determines that the first electronic device desires to make a video call with the second electronic device, or the second electronic device desires to make a video call with the first electronic device, the processing unit 12 may determine that a predetermined display condition is satisfied. In this case, the processing unit 12 may display, via the display unit 11, a first communication interface to be used for communicating with the second electronic device. In the case of performing video communication, the first communication interface may include a first region and a second region (in the case that shared data is transmitted), and the first region includes a first sub-region and/or a second sub-region. Herein, the first sub-region is for displaying video data of the first user (first information) acquired at the first electronic device side in real-time (e.g., via a camera module provided on the first electronic device), and the second sub-region is for displaying video data of the second user (second information) acquired at the second electronic device side in real-time.

In addition, the processing unit 12 further determines whether the first user at the first electronic device side triggers a content sharing identifier (e.g., an image or file sharing icon) used for initiating content sharing during the period that a video call is made between the first electronic device and the second electronic device. The content sharing identifier for example may be disposed in the first region. In an embodiment, the processing unit 12 may determine whether to display the second region by determining whether the first user clicks on the content sharing identifier. If it is determined that the content sharing identifier is triggered, then the processing unit 12 displays the second region via the display unit 11. Further, in another embodiment, the processing unit 12 may also determine whether it has received shared information from the second electronic device. Shared information may be image, audio, video, and other files, may also be an application or user data in an application. When it is determined that shared information has been received from the second electronic device, the processing unit 12 may display the second region via the display unit 11. Herein, the second region may be generated and displayed by being included in the first region. Further, the processing unit 12 may also, with the first region as a background, superimpose the second region for displaying the shared information on at least a portion of the first region. According to an embodiment of the present disclosure, display parameters like brightness, gradation, transparency and so on of the first region and the second region may be different, so as to facilitate the user distinguishing between the first region and the second region. Herein, at least part of the shared information is displayed on both the first electronic device and the second electronic device simultaneously, for being shared between the first user and the second user. For example, content to be shared like picture, video, PPT (one sheet therein) and so on may be simultaneously displayed on the first electronic device and the second region of the second electronic device to achieve sharing of the content.

According to an embodiment of the present disclosure, during a period of displaying the second region, the processing unit 12 performs data amount reduction processing at least on the first information that needs to be transmitted within a predetermined time period during the period of displaying the second region, so as to generate third information and transfer the third information to the second electronic device, wherein data amount of the third information is smaller than that of the corresponding first information.

Specifically, since shared information is displayed during the period of displaying the second region, and the shared information is always a focus of the first user and the second user, in this case, the first information and second information transmitted and received between the first electronic device and the second electronic device always are less important than the shared information, so in order to ensure timely transmission of the shared information, data amount of the first information that needs to be transmitted by the first electronic device can be reduced properly during the period of displaying the second region.

For example, according to an embodiment of the present disclosure, the processing unit 12 may perform data amount reduction processing on the first information that needs to be transmitted during the period of displaying the second region, so as to generate information whose data amount is reduced (hereinafter referred to as the third information) and transfer the third information to the second electronic device, wherein data amount of the third information is smaller than that of the corresponding (prior to the data amount reduction processing) first information. Performing data amount reduction processing on the first information to generate the third information will be described in detail below.

By the above-described manner, since the data amount of the first information to be transmitted is reduced, timely transmission of the shared information can be ensured, which thereby makes the transmission of the shared content between the first electronic device and the second electronic device be more smooth, thus improves user experience.

Further, according to another embodiment of the present disclosure, during the period of displaying the second region, the processing unit 12 may further determine whether there is a start or update for display of the shared information. When the processing unit 12 determines that there is a start or update for display of the shared information at the first electronic device side, the processing unit 12 may determine the predetermined time period based on the start or update for display of the shared information. According to an embodiment of the present disclosure, the processing unit 12 may determine whether there is a start or update for display of the shared information based on whether the content sharing identifier is triggered by the first user described previously. For example, the first user clicks on the content sharing identifier (icon) and selects a specific file (image, video, PPT etc.) according to a file list provided by the processing unit 12 based on monitoring the click, the processing unit 12 may determine that there is a start or update for display of the shared information. In this case, according to an embodiment of the present disclosure, when there is the start or update for display of the shared information, the processing unit 12 may determine that the time of transmitting the first information and the update of the shared information to the second electronic device is the predetermined time period, i.e., within the time period during which the update of the shared information is transmitted to the second electronic device via the communication unit 10, the information processing unit 12 performs data reduction processing on the first information and generates third information and transmits the third information via the communication unit 10, outside this time period (e.g., transmission of update of the shared information is completed or before another update of the shared information is transmitted), the information processing unit 12 does not perform data amount reduction processing on the first information.

By the manner described above, data amount reduction processing is performed on the first information only within the update period of the shared information, so that timely transmission of the update of the shared information can be ensured, the processing unit 12 does not perform processing on the first information during the period of needing not to transmit the update of the shared information and transmits the first information to the second electronic device directly via the communication unit 10, thereby ensures quality of the first information.

Further, according to another embodiment of the present disclosure, when it is determined that there is a start or update for display of the shared information, the processing unit 12 may further determine whether a predetermined data amount reduction condition is satisfied. If the predetermined data amount reduction condition is satisfied, then the processing unit 12 may determine that the time of transmitting the first information and the update of the shared information to the second electronic device is the predetermined time period.

For example, when determining whether a predetermined data amount reduction condition is satisfied, the processing unit 12 may detect status of the communication link and acquire bandwidth information associated with bandwidth of the communication link. Herein, the processing unit 12 may determine the bandwidth of the communication link between the first electronic device and the second electronic device and acquire bandwidth information associated with bandwidth of the communication link by any techniques. After the processing unit 12 acquires the bandwidth information, the processing unit 12 may determine whether the predetermined data amount reduction condition is satisfied based at least on the bandwidth information.

Specifically, according to an embodiment of the present disclosure, if the bandwidth of the communication link between the first electronic device and the second electronic device is sufficiently high, even if the data amount of the first information and the shared information is large, timely transmission of data of the first information and the shared information can also ensured. In this case, for example, if the bandwidth information indicates that the bandwidth of the communication link is higher than a first threshold value (e.g., 1 Mbps or above), the processing unit 12 determines that the predetermined data amount reduction condition is not satisfied. In this case, the processing unit 12 does not perform data amount reduction processing on the first information even if during the period of displaying the second region (determining the predetermined time period as zero), instead, it transmits the first information to the second electronic device directly via the communication unit 10.

Moreover, if the bandwidth information indicates that the bandwidth of the communication link is less than or equal to the first threshold value and higher than a second threshold value (e.g., 500 Kbps to 1 Mbps), the processing unit 12 determines that the predetermined data amount reduction condition is satisfied (for the sake of distinction, hereinafter referred to as the first data amount reduction condition). In the case that the processing unit 12 determines that the first data amount reduction condition is satisfied, the processing unit 12 may perform data amount reduction processing on the first information based on the first data amount reduction condition (for the sake of distinction, hereinafter referred to as the first data amount reduction processing). Herein, since in this case the bandwidth information indicates that, although the bandwidth of the communication link is not large enough, but still is able to support smooth transmission of a relatively large data amount, thus the first data amount reduction processing on the first information does not need to reduce a too large amount of data. In this case, in order to ensure quality of the first information, the first data amount reduction processing applied by the processing unit 12 may be a processing whose data amount reduction degree is relatively small.

Moreover, if the bandwidth information indicates that the bandwidth of the communication link is less than the second threshold value (e.g., 500 Kbps or less), then the processing unit determines that another data amount reduction condition (for the sake of distinction, hereinafter referred to as the second data amount reduction condition) is satisfied. In the case that the processing unit 12 determines that the second data amount reduction condition is satisfied, the processing unit 12 may perform a specific data amount reduction processing on the first information according to the second data amount reduction condition (for the sake of distinction, hereinafter referred to as the second data amount reduction processing). Herein, since in this case the bandwidth information indicates that the bandwidth of the communication link is relatively small, not sufficient to support smooth transmission of a large amount of data, in order to ensure transmission of the shared information, the second data amount reduction processing applied by the processing unit 12 may be a processing whose data amount reduction degree is relatively large. Herein, a data reduction degree of the second data amount reduction processing is greater than that of the first data amount reduction processing.

Further, in addition to the case of determining whether a predetermined data amount reduction condition is satisfied based on the bandwidth information, according to another embodiment of the present disclosure, the processing unit 12 may also determine whether a predetermined data amount reduction condition is satisfied based on the bandwidth information and a first data amount of the first information and a second data amount of update of the second information to be transmitted in a unit time period (e.g., 1 second). Herein, the processing unit 12 may determine the first data amount of the first information and the second data amount of update of the shared information to be transmitted in a unit time period based on the data amount of the first information generated in real-time within a unit time period and a data amount required to ensure the smooth transmission of the update of the shared information within a unit time period.

In this case, if the processing unit 12 determines that a first data amount of the first information and a second data amount of update of the shared information to be transmitted within a unit time period is less than or equal to the bandwidth of the communication link indicated by the bandwidth information, then the processing unit 12 determines that the preset data amount reduction condition is not satisfied, and at this time, the processing unit 12 does not perform data amount reduction processing on the first information and the update of the shared information, and transmits the first information to the second electronic device directly via the communication unit 10. Further, if the processing unit 12 determines that a first data amount of the first information and a second data amount of update of the shared information to be transmitted within a unit time period is larger than the bandwidth of the communication link indicated by the bandwidth information, then the processing unit 12 determines that the preset data amount reduction condition is satisfied, the processing unit 12 performs data amount reduction processing on the first information and generates third information, and transmits the generated third information to the second electronic device via the communication unit 10.

Although a plurality of embodiments of determining the predetermined data amount reduction condition are described above, the present disclosure is not limited thereto, other conditions for determining also fall into the protection scope of the present disclosure, as long as whether the data amount reduction processing is to be applied and the data amount reduction degree of the to-be-applied data amount reduction processing can be determined based on the bandwidth information.

By the above manners, the data amount of the first information to be transmitted can be controlled flexibly based on status of the communication link between the first electronic device and the second electronic device, thereby quality of the first information can be ensured while ensuring transmission of the update of the shared information.

Next, a variety of data amount reduction processing will be described. It should be noted that the above first data amount reduction processing and second data amount reduction processing may at least include the following manners, as long as it is ensured that a data reduction degree of the second data amount reduction processing is greater than that of the first data amount reduction processing.

According to an embodiment of the present disclosure, the data amount reduction processing may be implemented by lowering resolution of the first information. Specifically, the processing unit 12 may lower resolution of the first information to generate the third information with a resolution lower than that of the first information. For example, in the case that the resolution of the first information is 720P, the processing unit 12 may lower the resolution of the first information to 480P generate the third information with a resolution of 480P, and transmit the third information via the communication unit 10.

Further, according to an embodiment of the present disclosure, the processing unit 12 may perform data amount reduction processing on the first information by selecting at least one specific representative frame in the first information within a preset unit time period as the third information and generate a first display control instruction. Specifically, the processing unit 12 may select at least one specific representative frame in the first information within a preset unit time period (e.g., 1 second) as the third information. Herein, there are a variety of ways to select the representative frame as the third information. For example, the processing unit 12 may select a single frame in the first information within a unit time period as the third information. The processing unit 12 may select an odd-numbered or even-numbered frame in the first information within a unit time period as the third information. In addition, the processing unit 12 may select a frame every predetermined number of frames (e.g., 10 frames) as the third information. The processing unit 12 may monitor the first information (video data acquired in real-time), and when the processing unit 12 determines that a difference value between adjacent frames within a unit time period is larger than a preset threshed value (a big difference existing between two successive frames indicates a large activity or expression), the processing unit selects one representative frame of the adjacent frames as the third information. Herein, after selecting the representative frame as the third information, the processing unit 12 further generates a specific display control instruction (hereinafter referred to as the first display control instruction). Thereafter, the processing unit 12 transmits the third information and the first display control instruction to the second electronic device via the communication unit 10. Herein, the first display control instruction is for causing the third information to be displayed on the second electronic device within the preset unit time period. In this case, when the second electronic device receives the third information and the first display control instruction, within a preset unit time period, the second electronic device may continuously display the third information (e.g., in the case of selecting only one frame within a unit time period) or display the third information on a loop (e.g., in the case of selecting a plurality of frames within a unit time period) based on the first display control instruction. In this case, since the processing unit 12 only needs to transmit the third information whose data amount is extremely low within a unit time period, thereby it is possible to use a lot of bandwidth for transmission of the update of the shared information.

Further, according to another embodiment of the present disclosure, the processing unit 12 may further perform data amount reduction processing on the first information by selecting a portion of representative video frames in the first information within a preset unit time period as the third information and generating a second display control instruction. Specifically, the processing unit 12 may select any segment of video in a start part, a middle part, or an end part of a preset unit time period as the third information. In addition, the processing unit 12 may also select a segment of video whose difference value in adjacent frames is relatively large in a preset time period (which represents a large activity or expression of the first user) as the third information. Further, the processing unit 12 may further generate another display control command (hereinafter referred to as the second display control instruction). Herein, the second display control instruction is for causing the third information to be played on a loop within the preset unit time period. Then, the processing unit 12 transmits the third information and the second display control instruction to the second electronic device via the communication unit 10. When the second electronic device receives the third information and the second display control instruction, the second electronic device may play the third information on a loop within a preset time period based on the second display control instruction. In this case, since the processing unit 12 only needs to transmit the third information whose data amount is extremely low within a unit time period, thereby it is possible to use a lot of bandwidth for transmission of the update of the shared information.

Further, according to still another embodiment of the present disclosure, the data amount reduction processing may be further performed in the following manner: processing the first information to generate first medium information that contains first voice information of the first user as acquired by the first electronic device and first feature information representative of a feature of the first user, wherein the first feature information is for modifying first display information to generate second display information, and the second display information and the first voice information are transmitted to the second electronic device, so as to output the second display information and the first voice information on the second electronic device. Herein, different from the first information acquired via the camera of the first electronic device, in this embodiment of the present disclosure, the first display information is not video data acquired via the camera, but rather virtual display information of the first user of the first electronic device. Herein, it should be noted that, in the embodiment of the present disclosure, the second display information and the first voice information are equivalent to the third information (video data) described previously.

Specifically, the first display information may be a virtual image generated in advance or generated during the communication process based on a real image of the first user. According to the present embodiment, the first display information is generated by the following processing: obtaining the third display information; obtaining adjustment information at the first electronic device, the adjustment information is generated by that the first electronic device detects a feature of the first user, or generated by that the first electronic device receives an instruction from the first user; and generating the first display information based on the third display information and the adjustment information. Herein, the third display information is reference virtual display information. For example, in the case that the first display information is an image representing face image of the first user, the third display information may be an image of the reference face image. Also for example, in the case the first display information is an image representing the bust/body image of the first user, the third display information may an image of the reference bust/body image. Herein, the third display information may be stored in the first electronic device in advance; thereby the first display information can be generated based on the third display information and the adjustment information.

When generating the first display information, the processing unit 12 may obtain the adjustment information at the first electronic device. The adjustment information is for adjusting the third display information so that the generated first display information is more consistent with the real image of the first user. For example, in the case that the third display information is face image, the adjustment information may include information with regard to details (features) about facial features, hair, eyebrow, skin color, hair color, texture, etc. In addition, in an example, the adjustment information may be generated by the processing unit 12 based on an instruction of the first user. Specifically, the processing unit 12 may obtain the third display information stored in advance, and present it to the first user via the display unit 11. Further, the processing unit 12 may also present alternatives with regard to the above described various features to the first user via the display unit 11. The alternatives may be presented in the form of graphics, and displayed in manner of superimposing/replacing with the third display information based on a selection of the user, so as to facilitate the user intuitively previewing a result after the adjustment and thereby make a confirmation so as to generate the first display information. Moreover, in another example, the adjustment information may be automatically generated by that the processing unit 12 (camera) detects a feature of the first user. Specifically, a feature of the first user, such as facial feature, hair, eyebrow, skin color, hair color, texture etc. as described above can be detected by a camera. In this case, the processing unit 12 may compare the above described feature with the third display information, to generate the adjustment information. Herein, since details of the comparing processing is known by those skilled in the art of image processing, no more details repeated herein.

After obtaining the adjustment information in the various ways described above, the third display processing unit 12 generates the first display information based on the third display information and the adjustment information. Specifically, the third processing unit 12 may adjust in accordance with the adjustment information based on the third display information (reference image), so as to generate the first display information (virtual image). Herein, the processing unit 12 may adopt a variety of conventional image processing methods to generate the first display information, no more details described. Herein, after generating the first display information, the generated first display information may be stored in the first electronic device for subsequent use.

In the process of generating the second display information, the first display information is modified through a first feature in first medium information so as to generate the second display information. Specifically, the first medium information may include first voice information of the first user acquired by the first electronic device and first feature information indicating a feature of the first user. Herein, the first feature information may be information of change that occurs to a feature of the first user during the communication process, for example, change about facial expression of the user, change about mouth, change about hand gesture, and other information. Herein, the first feature information may be obtained by that the processing unit 12 carries out image recognition on the image of the first user obtained by the camera of the first electronic device. In this case, the first processing unit 12 may modify the first display image based on the first feature information contained in the first medium information to generate the second display information. Herein, a variety image processing modes, like modes similar to the processing mode of modifying the third display information based on the adjustment information to generate the virtual image, may be adopted to modify the virtual image based on the first feature information to generate the second display information, that is, a real-time virtual image reflecting a real-time change of the first user during the communication process.

By the above-described manner, since the second display information is a real-time virtual image reflecting a real-time change of the first user during the communication process, and it exhibits less details compared with the real image of the first user, thus the data amount of transmitting the second display information is obviously less than that of transmitting the real image of the first user, thereby the data amount of transmitting the third information that contains the second display information is reduced notably. Further, the above processing (e.g., generating the first display information, generating the second display information, etc.) may also be carried out at a remote server of the first electronic device, in this case, the processing unit 12 only needs to transmit the first feature information to the server via the communication unit 10, and the server completes the above processing and thereafter transmits the second display information to the second electronic device, thereby more data of update of the shared information can be transmitted during a unit time period.

Performing data amount reduction processing on the first information (video data) of the first user as acquired in real-time at the first electronic device side (e.g., via a camera module provided on the first electronic device) to generate the third information has been described in the above, but the present disclosure is not limited thereto. Since during the period that the first electronic device and the second electronic device carry out a video communication, in addition to transmission of the first information or the third information, the first electronic device also needs to transmit audio data (hereinafter referred to as the fourth information), therefore, according to an embodiment of the present disclosure, the processing unit 12 may also perform another data amount reduction processing on the fourth information within a predetermined time period during the period of displaying the second region to generate audio data with a reduced data amount (hereinafter referred to as the fifth information).

According to an embodiment of the present disclosure, similar to the previous description, the processing unit 12 may perform data amount reduction processing on the fourth information within a predetermined time period during the period of displaying the second region to generate the fifth information and transmits the fifth information to the second electronic device, or the processing unit 12 may perform data amount reduction processing on the fourth information within a period of transmitting the first information and the shared information to the second electronic device during the period of displaying the second period, so as to generate the fifth information and transmit the fifth information to the second electronic device.

Further, according to another embodiment of the present disclosure, during the period of transmitting the first information and the update of the shared information to the second electronic device, the processing unit 12 may further determine whether to perform data amount reduction processing on the fourth data (information) based on the predetermined condition described in the above. For example, when it is determined not to perform data amount reduction processing on the first information based on the determining process described previously (determining the predetermined time period as zero), the processing unit 12 determines there is no need to process the fourth information and transmits the fourth information directly to the second electronic devices. Further, according to another embodiment of the disclosure, when the second electronic determines that the forgoing predetermined condition is satisfied, the processing unit 12 determines to perform data amount reduction processing on the fourth information so as to generate fifth information and transmit the fifth information to the second electronic device. Herein, the data amount reduction processing may include any type of audio compression technique like reducing a sampling rate of the fourth information (e.g., reducing from 192 KHz to 48 KHz). In this case, more bandwidth can be further used for transmitting the update of the shared information to ensure timely transmission of the shared information. In addition, since when the first user of the first electronic device and the second user of the second electronic device are sharing content, importance of audio data is often higher than that of the video data (e.g., discussing PPT, sharing tourism experience and so on), therefore according to another embodiment of the present disclosure, even if the processing unit 12 determines the foregoing predetermined conditions are satisfied, the processing unit 12 may determine not to perform data amount reduction processing on the fourth information, and transmit the fourth information directly to the second electronic device. In this case, quality of the transmitted fourth information (audio data) can be ensured while performing data amount reduction processing on the first information to ensure transmission of the shared information, which thereby achieves content sharing with better user experience between the first user and the second user.

The information processing apparatus according to an embodiment of the present disclosure has been described in the above. Hereinafter, an information processing method according to an embodiment of the present disclosure will be described with reference to FIG. 2. Herein, the method shown in FIG. 2 may be applied to the first electronic device described previously.

Figure 2:
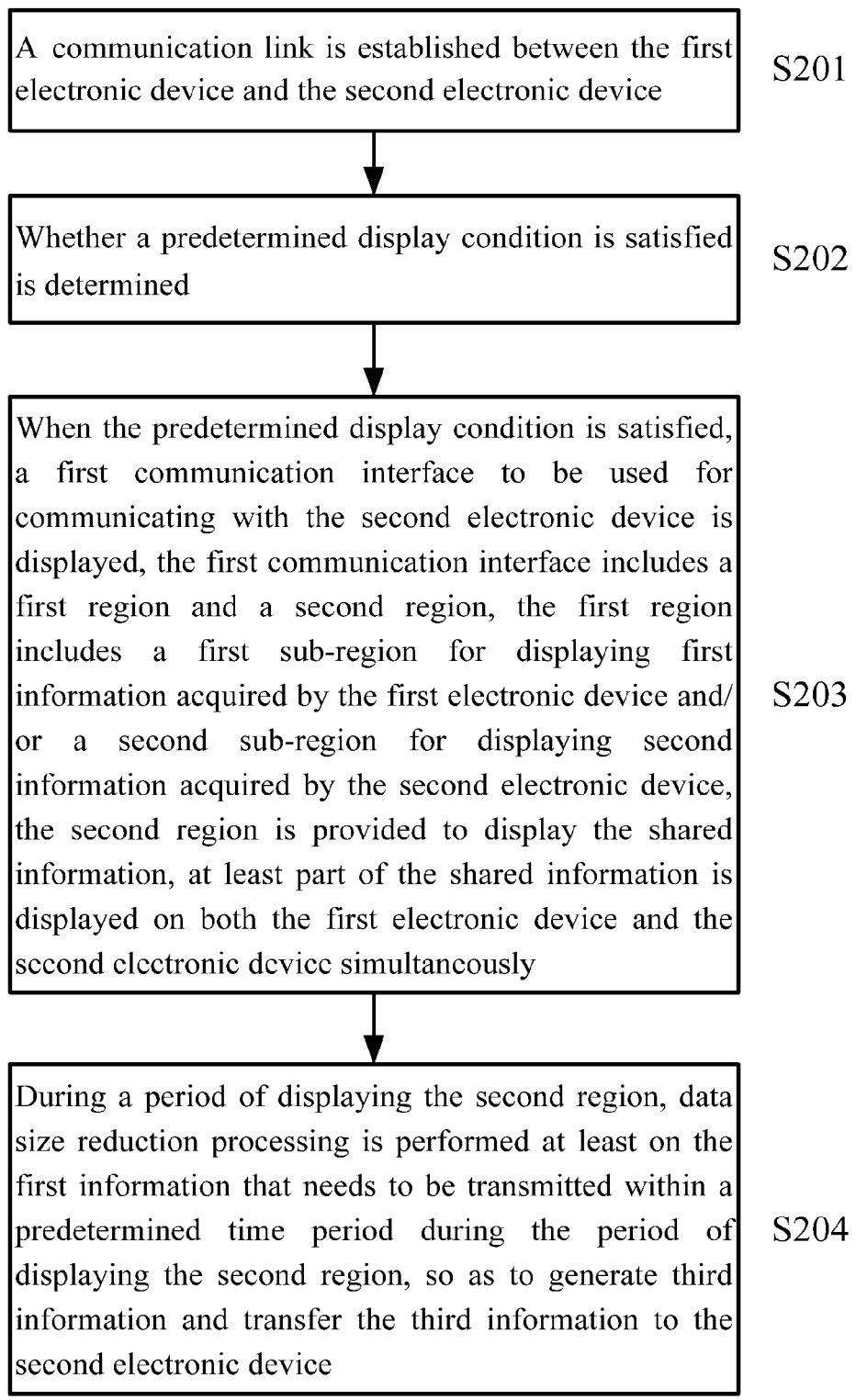
FIG. 2 is a schematic flowchart illustrating an information processing method according to an embodiment of the present disclosure.

As shown in FIG. 2, in step S201, a communication link is established between the first electronic device and the second electronic device. In step S202, whether a predetermined display condition is satisfied is determined. In step S203, when the predetermined display condition is satisfied, a first communication interface to be used for communicating with the second electronic device is displayed. Herein, the first communication interface may include a first region and a second region that are not totally identical, the first region includes a first sub-region for displaying first information acquired by the first electronic device and/or a second sub-region for displaying second information acquired by the second electronic device. Herein, in case of presence of shared information, the second region is provided to display the shared information, at least part of the shared information is displayed on both the first electronic device and the second electronic device simultaneously. In step S204, during a period of displaying the second region, data amount reduction processing is performed at least on the first information that needs to be transmitted within a predetermined time period during the period of displaying the second region, so as to generate third information and transfer the third information to the second electronic device. Herein, data amount of the third information is smaller than that of the corresponding first information.

Specifically, in step S201, when the first electronic device requests to communicate with the second electronic device and a user of the second electronic device (hereinafter referred to as the second user) confirms or when the second electronic device requests to communicate with the first electronic device and a user of the first electronic device (hereinafter referred to as the first user) confirms, the processing unit 12 establishes a communication link between the first electronic device and the second electronic device via the communication unit 10.

In this case, in step S202, the processing unit 12 determines whether a predetermined display condition is satisfied. When the processing unit 12 determines that the first electronic device desires to make a video call with the second electronic device, or the second electronic device desires to make a video call with the first electronic device, the processing unit 12 determines that a predetermined display condition is satisfied.

In this case, in step S203, the processing unit 12 may display, via the display unit 11, a first communication interface to be used for communicating with the second electronic device. In the case of performing video communication, the first communication interface may include a first region and a second region (in the case that shared data is transmitted), and the first region includes a first sub-region and/or a second sub-region. Herein, the first sub-region is for displaying video data of the first user (first information) acquired at the first electronic device side in real-time (e.g., via a camera module provided on the first electronic device), and the second sub-region is for displaying video data of the second user (second information) acquired at the second electronic device side in real-time. In addition, the processing unit 12 further determines whether the first user at the first electronic device side triggers a content sharing identifier (e.g., an image or file sharing icon) used for initiating content sharing during the period that a video call is made between the first electronic device and the second electronic device. The content sharing identifier for example may be disposed in the first region. In an embodiment, the processing unit 12 may determine whether to display the second region by determining whether the first user clicks on the content sharing identifier. If it is determined that the content sharing identifier is triggered, then the processing unit 12 displays the second region via the display unit 11. Further, in another embodiment, the processing unit 12 may also determine whether it has received shared information from the second electronic device. Shared information may be image, audio, video, and other files, may also be an application or user data in an application. When it is determined that shared information has been received from the second electronic device, the processing unit 12 may display the second region via the display unit 11. Herein, the second region may be generated and displayed by being included in the first region. Further, the processing unit 12 may also, with the first region as a background, superimpose the second region for displaying the shared information on at least a portion of the first region. According to an embodiment of the present disclosure, display parameters like brightness, gradation, transparency and so on of the first region and the second region may be different, so as to facilitate the user distinguishing between the first region and the second region. Herein, a second region is configured to display the shared information, and at least part of the shared information is displayed on both the first electronic device and the second electronic device simultaneously, for being shared between the first user and the second user. For example, content to be shared like picture, video, PPT and so on may be displayed in the second region.

In step S204, during a period of displaying the second region, the processing unit 12 performs data amount reduction processing at least on the first information that needs to be transmitted within a predetermined time period during the period of displaying the second region, so as to generate third information and transfer the third information to the second electronic device, wherein data amount of the third information is smaller than that of the corresponding first information. Specifically, since shared information is displayed during the period of displaying the second region, and the shared information is always a focus of the first user and the second user, in this case, the first information and second information transmitted and received between the first electronic device and the second electronic device always are less important than the shared information, so in order to ensure timely transmission of the shared information, data amount of the first information that needs to be transmitted by the first electronic device can be reduced properly during the period of displaying the second region. For example, according to an embodiment of the present disclosure, the processing unit 12 may perform data amount reduction processing on the first information that needs to be transmitted during the period of displaying the second region, so as to generate information whose data amount is reduced (hereinafter referred to as the third information) and transfer the third information to the second electronic device, wherein data amount of the third information is smaller than that of the corresponding (prior to the data amount reduction processing) first information.

Further, according to another embodiment of the present disclosure, step S204 further comprises: when there is the start or update for display of the shared information, determining whether a predetermined data amount reduction condition is satisfied; and if the predetermined data amount reduction condition is satisfied, then determining that the update time of transmitting the first information and the shared information to the second electronic device is the predetermined time period.

Specifically, when determining whether a predetermined data amount reduction condition is satisfied, the processing unit 12 may detect status of the communication link and acquire bandwidth information associated with bandwidth of the communication link. Herein, the processing unit 12 may determine the bandwidth of the communication link between the first electronic device and the second electronic device and acquire bandwidth information associated with bandwidth of the communication link by any techniques. After the processing unit 12 acquires the bandwidth information, processing unit 12 may determine whether the predetermined data amount reduction condition is satisfied based at least on the bandwidth information.

Specifically, according to an embodiment of the present disclosure, if the bandwidth of the communication link between the first electronic device and the second electronic device is sufficiently high, even if the data amount of the first information and the shared information is large, timely transmission of data of the first information and the shared information can also ensured. In this case, for example, if the bandwidth information indicates that the bandwidth of the communication link is higher than a first threshold value (e.g., 1 Mbps or above), the processing unit 12 determines that the predetermined data amount reduction condition is not satisfied. In this case, the processing unit 12 does not perform data amount reduction processing on the first information even if during the period of displaying the second region (determining the predetermined time period as zero), instead, it transmits the first information to the second electronic device directly via the communication unit 10.

Moreover, if the bandwidth information indicates that the bandwidth of the communication link is less than or equal to the first threshold value and higher than a second threshold value (e.g., 500 Kbps to 1 Mbps), the processing unit 12 determines that the predetermined data amount reduction condition is satisfied (for the sake of distinction, hereinafter referred to as the first data amount reduction condition). In the case that the processing unit 12 determines that the first data amount reduction condition is satisfied, the processing unit 12 may perform data amount reduction processing on the first information based on the first data amount reduction condition (for the sake of distinction, hereinafter referred to as the first data amount reduction processing). Herein, since in this case the bandwidth information indicates that, although the bandwidth of the communication link is not large enough, but still is able to support smooth transmission of a relatively large data amount, thus the first data amount reduction processing on the first information does not need to reduce a too large amount of data. In this case, in order to ensure quality of the first information, the first data amount reduction processing applied by the processing unit 12 may be a processing whose data amount reduction degree is relatively small.

Moreover, if the bandwidth information indicates that the bandwidth of the communication link is less than the second threshold value (e.g., 500 Kbps or less), then the processing unit determines that another data amount reduction condition (for the sake of distinction, hereinafter referred to as the second data amount reduction condition) is satisfied. In the case that the processing unit 12 determines that the second data amount reduction condition is satisfied, the processing unit 12 may perform a specific data amount reduction processing on the first information according to the second data amount reduction condition (for the sake of distinction, hereinafter referred to as the second data amount reduction processing). Herein, since in this case the bandwidth information indicates that the bandwidth of the communication link is relatively small, not sufficient to support smooth transmission of a large amount of data, in order to ensure transmission of the shared information, the second data amount reduction processing applied by the processing unit 12 may be a processing whose data amount reduction degree is relatively large. Herein, a data reduction degree of the second data amount reduction processing is greater than that of the first data amount reduction processing.

Further, in addition to the case of determining whether a predetermined data amount reduction condition is satisfied based on the bandwidth information, according to another embodiment of the present disclosure, the processing unit 12 may also determine whether a predetermined data amount reduction condition is satisfied based on the bandwidth information and a first data amount of the first information and a second data amount of update of the second information to be transmitted in a unit time period (e.g., 1 second). Herein, the processing unit 12 may determine the first data amount of the first information to be transmitted within a unit time period and the second data amount of update of the shared information to be transmitted in a unit time period based on the data amount of the first information generated in real-time within a unit time period and a data amount required to ensure the smooth transmission of the update of the shared information within a unit time period.

In this case, if the processing unit 12 determines that a first data amount of the first information and a second data amount of update of the shared information to be transmitted within a unit time period is less than or equal to the bandwidth of the communication link indicated by the bandwidth information, then the processing unit 12 determines that the preset data amount reduction condition is not satisfied, and at this time, the processing unit 12 does not perform data amount reduction processing on the first information and the update of the shared information, and transmits the first information to the second electronic device directly via the communication unit 10. Further, if the processing unit 12 determines that a first data amount of the first information and a second data amount of update of the shared information to be transmitted within a unit time period is larger than the bandwidth of the communication link indicated by the bandwidth information, then the processing unit 12 determines that the preset data amount reduction condition is satisfied, the processing unit 12 performs data amount reduction processing on the first information and generates third information, and transmits the generated third information to the second electronic device via the communication unit 10.

Although a plurality of embodiments of determining the predetermined data amount reduction condition are described above, the present disclosure is not limited thereto, other conditions for determining also fall into the protection scope of the present disclosure, as long as whether the data amount reduction processing is to be applied and the data amount reduction degree of the to-be-applied data amount reduction processing can be determined based on the bandwidth information.

By the above manners, the data amount of the first information to be transmitted can be controlled flexibly based on status of the communication link between the first electronic device and the second electronic device, thereby quality of the first information can be ensured while ensuring transmission of the update of the shared information.

Next, a variety of data amount reduction processing will be described. It should be noted that the above first data amount reduction processing and second data amount reduction processing may at least include the following manners, as long as it is ensured that a data reduction degree of the second data amount reduction processing is greater than that of the first data amount reduction processing.

According to an embodiment of the present disclosure, the data amount reduction processing may be implemented by lowering resolution of the first information. Specifically, the processing unit 12 may lower resolution of the first information to generate the third information with a resolution lower than that of the first information. For example, in the case that the resolution of the first information is 720P, the processing unit 12 may lower the resolution of the first information to 480P generate the third information with a resolution of 480P, and transmit the third information via the communication unit 10.

Further, according to an embodiment of the present disclosure, the processing unit 12 may perform data amount reduction processing on the first information by selecting at least one specific representative frame in the first information within a preset unit time period as the third information and generate a first display control instruction. Specifically, the processing unit 12 may select at least one specific representative frame in the first information within a preset unit time period (e.g., 1 second) as the third information. Herein, there are a variety of ways to select the representative frame as the third information. For example, the processing unit 12 may select a single frame in the first information within a unit time period as the third information. The processing unit 12 may select an odd-numbered or even-numbered frame in the first information within a unit time period as the third information. In addition, the processing unit 12 may select a frame every predetermined number of frames (e.g., 10 frames) as the third information. The processing unit 12 may monitor the first information (video data acquired in real-time), and when the processing unit 12 determines that a difference value between adjacent frames within a unit time period is larger than a preset threshed value (a big difference existing between two successive frames indicates a large activity or expression), the processing unit selects one representative frame of the adjacent frames as the third information. Herein, after selecting the representative frame as the third information, the processing unit 12 further generates a specific display control instruction (hereinafter referred to as the first display control instruction). Thereafter, the processing unit 12 transmits the third information and the first display control instruction to the second electronic device via the communication unit 10. Herein, the first display control instruction is for causing the third information to be displayed on the second electronic device within the preset unit time period. In this case, when the second electronic device receives the third information and the first display control instruction, within a preset unit time period, the second electronic device may continuously display the third information (e.g., in the case of selecting only one frame within a unit time period) or display the third information on a loop (e.g., in the case of selecting a plurality of frames within a unit time period) based on the first display control instruction. In this case, since the processing unit 12 only needs to transmit the third information whose data amount is extremely low within a unit time period, thereby it is possible to use a lot of bandwidth for transmission of the update of the shared information.

Further, according to another embodiment of the present disclosure, the processing unit 12 may further perform data amount reduction processing on the first information by selecting a portion of representative video frames in the first information within a preset unit time period as the third information and generating a second display control instruction. Specifically, the processing unit 12 may select any segment of video in a start part, a middle part, or an end part of a preset unit time period as the third information. In addition, the processing unit 12 may also select a segment of video whose difference value in adjacent frames is relatively large in a preset time period (which represents a large activity or expression of the first user) as the third information. Further, the processing unit 12 may further generate another display control command (hereinafter referred to as the second display control instruction). Herein, the second display control instruction is for causing the third information to be played on a loop within the preset unit time period. Then, the processing unit 12 transmits the third information and the second display control instruction to the second electronic device via the communication unit 10. When the second electronic device receives the third information and the second display control instruction, the second electronic device may play the third information on a loop within a preset time period based on the second display control instruction. In this case, since the processing unit 12 only needs to transmit the third information whose data amount is extremely low within a unit time period, thereby it is possible to use a lot of bandwidth for transmission of the update of the shared information.

Further, according to still another embodiment of the present disclosure, the data amount reduction processing may be further performed in the following manner: processing the first information to generate first medium information that contains first voice information of the first user as acquired by the first electronic device and first feature information representative of a feature of the first user, wherein the first feature information is for modifying first display information to generate second display information, and the second display information and the first voice information are transmitted to the second electronic device, so as to output the second display information and the first voice information on the second electronic device. Herein, different from the first information acquired via the camera of the first electronic device, in this embodiment of the present disclosure, the first display information is not video data acquired via the camera, but rather virtual display information of the first user of the first electronic device. Herein, it should be noted that, in the embodiment of the present disclosure, the second display information and the first voice information are equivalent to the third information (video data) described previously.

Here, the first display information may be a virtual image generated in advance or generated during the communication process based on a real image of the first user. According to the present embodiment, the first display information is generated by the following processing: obtaining the third display information; obtaining adjustment information at the first electronic device, the adjustment information is generated by that the first electronic device detects a feature of the first user, or generated by that the first electronic device receives an instruction from the first user; and generating the first display information based on the third display information and the adjustment information. Herein, the third display information is reference virtual display information. For example, in the case that the first display information is an image representing face image of the first user, the third display information may be an image of the reference face image. Also for example, in the case the first display information is an image representing the bust/body image of the first user, the third display information may an image of the reference bust/body image. Herein, the third display information may be stored in the first electronic device in advance; thereby the first display information can be generated based on the third display information and the adjustment information.

Particularly, when generating the first display information, the processing unit 12 may obtain the adjustment information at the first electronic device. The adjustment information is for adjusting the third display information so that the generated first display information is more consistent with the real image of the first user. For example, in the case that the third display information is face image, the adjustment information may include information with regard to details (features) about facial features, hair, eyebrow, skin color, hair color, texture, etc. In addition, in an example, the adjustment information may be generated by the processing unit 12 based on an instruction of the first user. Specifically, the processing unit 12 may obtain the third display information stored in advance, and present it to the first user via the display unit 11. Further, the processing unit 12 may also present alternatives with regard to the above described various features to the first user via the display unit 11. The alternatives may be presented in the form of graphics, and displayed in manner of superimposing/replacing with the third display information based on a selection of the user, so as to facilitate the user intuitively previewing a result after the adjustment and thereby make a confirmation so as to generate the first display information.

Moreover, in another example, the adjustment information may be automatically generated by that the processing unit 12 (camera) detects a feature of the first user. Specifically, a feature of the first user, such as facial feature, hair, eyebrow, skin color, hair color, texture etc. as described above can be detected by a camera. In this case, the processing unit 12 may compare the above described feature with the third display information, to generate the adjustment information. Herein, since details of the comparing processing is known by those skilled in the art of image processing, no more details repeated herein.

After obtaining the adjustment information in the various ways described above, the third display processing unit 12 generates the first display information based on the third display information and the adjustment information. Specifically, the third processing unit 12 may adjust in accordance with the adjustment information based on the third display information (reference image), so as to generate the first display information (virtual image). Herein, the processing unit 12 may adopt a variety of conventional image processing methods to generate the first display information, no more details described. Herein, after generating the first display information, the generated first display information may be stored in the first electronic device for subsequent use.

In the process of generating the second display information, the first display information is modified through a first feature in first medium information so as to generate the second display information. Specifically, the first medium information may include first voice information of the first user acquired by the first electronic device and first feature information indicating a feature of the first user. Herein, the first feature information may be information of change that occurs to a feature of the first user during the communication process, for example, change about facial expression of the user, change about mouth, change about hand gesture, and other information. Herein, the first feature information may be obtained by that the processing unit 12 carries out image recognition on the image of the first user obtained by the camera of the first electronic device. In this case, the first processing unit 12 may modify the first display image based on the first feature information contained in the first medium information to generate the second display information. Herein, a variety image processing modes, like modes similar to the processing mode of modifying the third display information based on the adjustment information to generate the virtual image, may be adopted to modify the virtual image based on the first feature information to generate the second display information, that is, a real-time virtual image reflecting a real-time change of the first user during the communication process.

Performing data amount reduction processing on the first information (video data) of the first user as acquired in real-time at the first electronic device side (e.g., via a camera module provided on the first electronic device) to generate the third information has been described in the above, but the present disclosure is not limited thereto. Since during the period that the first electronic device and the second electronic device carry out a video communication, in addition to transmission of the first information or the third information, the first electronic device also needs to transmit audio data (hereinafter referred to as the fourth information), therefore, according to an embodiment of the present disclosure, the processing unit 12 may also perform another data amount reduction processing on the fourth information within a predetermined time period during the period of displaying the second region to generate audio data with a reduced data amount (hereinafter referred to as the fifth information).

According to an embodiment of the present disclosure, similar to the previous description, the processing unit 12 may perform data amount reduction processing on the fourth information within a predetermined time period during the period of displaying the second region to generate the fifth information and transmits the fifth information to the second electronic device, or the processing unit 12 may perform data amount reduction processing on the fourth information within a period of transmitting the first information and the shared information to the second electronic device during the period of displaying the second period, so as to generate the fifth information and transmit the fifth information to the second electronic device.

Further, according to another embodiment of the present disclosure, during the period of transmitting the first information and the update of the shared information to the second electronic device, the processing unit 12 may further determine whether to perform data amount reduction processing on the fourth data (information) based on the predetermined condition described in the above. For example, when it is determined not to perform data amount reduction processing on the first information based on the determining process described previously (determining the predetermined time period as zero), the processing unit 12 determines there is no need to process the fourth information and transmits the fourth information directly to the second electronic devices. Further, according to another embodiment of the disclosure, when the second electronic determines that the forgoing predetermined condition is satisfied, the processing unit 12 determines to perform data amount reduction processing on the fourth information so as to generate fifth information and transmit the fifth information to the second electronic device. Herein, the data amount reduction processing may include any type of audio compression technique like reducing a sampling rate of the fourth information (e.g., reducing from 192 KHz to 48 KHz). In this case, more bandwidth can be further used for transmitting the update of the shared information to ensure timely transmission of the shared information. In addition, since when the first user of the first electronic device and the second user of the second electronic device are sharing content, importance of audio data is often higher than that of the video data (e.g., discussing PPT, sharing tourism experience and so on), therefore according to another embodiment of the present disclosure, even if the processing unit 12 determines the foregoing predetermined conditions are satisfied, the processing unit 12 may determine not to perform data amount reduction processing on the fourth information, and transmit the fourth information directly to the second electronic device. In this case, quality of the transmitted fourth information (audio data) can be ensured while performing data amount reduction processing on the first information to ensure transmission of the shared information, which thereby achieves content sharing with better user experience between the first user and the second user.

In the above, the information processing apparatus and information processing method according to the embodiments of the present disclosure are described with reference to FIG. 1 to FIG. 2.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invnetion claimed is:

1. An information processing method applied to a first electronic device, the information processing method comprising:

establishing a communication link between the first electronic device and a second electronic device;

determining whether a predetermined display condition is satisfied;

when the predetermined display condition is satisfied, displaying a first communication interface to be used for communicating with the second electronic device, wherein the first communication interface can include a first region and a second region that are not totally identical, the first region includes a first sub-region for displaying first information acquired by the first electronic device and/or a second sub-region for displaying second information acquired by the second electronic device, in case of presence of shared information, the second region is provided to display the shared information, at least part of the shared information is displayed on both the first electronic device and the second electronic device simultaneously;

during a period of displaying the second region, performing data amount reduction processing at least on the first information that needs to be transmitted within a predetermined time period during the period of displaying the second region, so as to generate third information and transfer the third information to the second electronic device, wherein a data amount of the third information is smaller than that of the corresponding first information.

2. The information processing method according to claim 1, wherein the step of performing data amount reduction processing at least on the first information that needs to be transmitted within a predetermined time period during the period of displaying the second region further comprises:

during the period of displaying the second region, determining whether there is a start or update for display of the shared information;

when it is determined that there is a start or update for display of the shared information, determining the predetermined time period based on the start or update for display of the shared information.

3. The information processing method according to claim 2, wherein the step of determining the predetermined time period based on the start or update for display of the shared information further comprises:

when there is the start or update for display of the shared information, determining whether a predetermined data amount reduction condition is satisfied; and if the predetermined data amount reduction condition is satisfied, then determining that the update time of transmitting the first information and the shared information to the second electronic device is the predetermined time period.

4. The information processing method according to claim 2, wherein the step of determining whether a predetermined data amount reduction condition is satisfied further comprises:

detecting status of the communication link and acquiring bandwidth information associated with bandwidth of the communication link; and determining whether the predetermined data amount reduction condition is satisfied based at least on the bandwidth information.

5. The information processing method according to claim 4, wherein:

if the bandwidth information indicates that the bandwidth of the communication link is higher than a first threshold value, then it is determined that the predetermined data amount reduction condition is not satisfied, and data amount reduction processing is not performed on the first information and the update of the shared information;

if the bandwidth information indicates that the bandwidth of the communication link is less than or equal to the first threshold value and higher than a second threshold value, then it is determined that the predetermined data amount reduction condition is satisfied, a first data amount reduction processing is performed on the first information based on the first data amount reduction condition; or if the bandwidth information indicates that the bandwidth of the communication link is less than the second threshold value, then it is determined that a second data amount reduction condition is satisfied, a second data amount reduction processing is performed on the first information based on the second data amount reduction condition, and a data reduction degree of the second data amount reduction processing is greater than that of the first data amount reduction processing.

6. The information processing method according to claim 5, wherein the first information is video data acquired in real-time by the first electronic device.

7. The information processing method according to claim 1, wherein the data amount reduction processing includes at least one of:

lowering resolution of the first information to generate the third information having a resolution lower than that of the first information;

selecting at least one specific representative frame in the first information within a preset unit time period as the third information and generating a first display control instruction, the third information and the first display control information being transmitted to the second electronic device, the first display control instruction being for causing the third information to be displayed on the second electronic device within the preset unit time period; and selecting a portion of representative video frames in the first information within a preset unit time period as the third information and generating a second display control instruction, the third information and the second display control instruction being transmitted to the second electronic device, the second display control instruction being for causing the third information to be played on a loop within the preset unit time period.

8. The information processing method according to claim 1, wherein the data amount reduction processing comprises processing the first information to generate first medium information that contains first voice information of the first user as acquired by the first electronic device and first feature information representative of a feature of the first user, wherein the first feature information is for modifying first display information to generate second display information, and the second display information and the first voice information are transmitted to the second electronic device, so as to output the second display information and the first voice information at the second electronic device.

9. The information processing method according to claim 8, wherein the first display information is virtual display information of the first user and generated by steps of:

obtaining third display information, which is reference virtual display information;

obtaining adjustment information at the first electronic device, the adjustment information is generated by that the first electronic device detects a feature of the first user, or generated by that the first electronic device receives an instruction from the first user; and generating the first display information based on the third display information and the adjustment information.

10. The information processing method according to claim 4, wherein:

if it is determined that a first data amount of the first information and a second data amount of update of the shared information to be transmitted within a unit time period is less than or equal to the bandwidth of the communication link indicated by the bandwidth information, then it is determined that the preset data amount reduction condition is not satisfied, and data amount reduction processing is not performed on the first information and the update of the shared information; or if it is determined that a first data amount of the first information and a second data amount of update of the shared information to be transmitted within a unit time period is larger than the bandwidth of the communication link indicated by the bandwidth information, then it is determined that the preset data amount reduction condition is satisfied, data amount reduction processing is performed on the first information.

11. An information processing apparatus applied to a first electronic device, the information processing apparatus comprising:

a communication unit configured to establish a communication link between the first electronic device and a second electronic device;

a display unit configured to display image;

a processing unit configured to perform preset processing based on a preset instruction, wherein the processing unit is configured to:

determine whether a predetermined display condition is satisfied;

when the predetermined display condition is satisfied, display, via the display unit, a first communication interface to be used for communicating with the second electronic device, wherein the first communication interface can include a first region and a second region that are not totally identical, the first region includes a first sub-region for displaying first information acquired by the first electronic device and/or a second sub-region for displaying second information acquired by the second electronic device, in case of presence of shared information, the second region is provided to display the shared information, at least part of the shared information is displayed on both the first electronic device and the second electronic device simultaneously; and during a period of displaying the second region, perform data amount reduction processing at least on the first information that needs to be transmitted within a predetermined time period during the period of displaying the second region, so as to generate third information and transfer the third information to the second electronic device, wherein data amount of the third information is smaller than that of the corresponding first information.

12. The information processing apparatus according to claim 11, wherein:

during the period of displaying the second region, the processing unit further determines whether there is a start or update for display of the shared information; and when it is determined that there is a start or update for display of the shared information, the processing unit determines the predetermined time period based on the start or update for display of the shared information.

13. The information processing apparatus according to claim 12, wherein:

when there is the start or update for display of the shared information, the processing unit determines whether a predetermined data amount reduction condition is satisfied;

if the predetermined data amount reduction condition is satisfied, then the processing unit determines that the update time of transmitting the first information and the shared information to the second electronic device is the predetermined time period.

14. The information processing apparatus according to claim 12, wherein:

when determining whether a predetermined data amount reduction condition is satisfied, the processing unit detects status of the communication link and acquires bandwidth information associated with bandwidth of the communication link; and the processing unit determines whether the predetermined data amount reduction condition is satisfied based at least on the bandwidth information.

15. The information processing apparatus according to claim 14, wherein:

if the bandwidth information indicates that the bandwidth of the communication link is higher than a first threshold value, then the processing unit determines that the predetermined data amount reduction condition is not satisfied, and data amount reduction processing is not performed on the first information and the update of the shared information;

if the bandwidth information indicates that the bandwidth of the communication link is less than or equal to the first threshold value and higher than a second threshold value, then the processing unit determines that the predetermined data amount reduction condition is satisfied, a first data amount reduction processing is performed on the first information based on the first data amount reduction condition; or if the bandwidth information indicates that the bandwidth of the communication link is less than the second threshold value, then the processing unit determines that a second data amount reduction condition is satisfied, a second data amount reduction processing is performed on the first information based on the second data amount reduction condition, and a data reduction degree of the second data amount reduction processing is greater than that of the first data amount reduction processing.

16. The information processing apparatus according to claim 15, wherein the first information is video data acquired in real-time by the first electronic device.

17. The information processing apparatus according to claim 11, wherein the data amount reduction processing includes at least one of:

lowering resolution of the first information to generate the third information having a resolution lower than that of the first information;

selecting at least one specific representative frame in the first information within a preset unit time period as the third information and generating a first display control instruction, the third information and the first display control information being transmitted to the second electronic device, the first display control instruction being for causing the third information to be displayed on the second electronic device within the preset unit time period; and selecting a portion of representative video frames in the first information within a preset unit time period as the third information and generating a second display control instruction, the third information and the second display control instruction being transmitted to the second electronic device, the second display control instruction being for causing the third information to be played on a loop within the preset unit time period.

18. The information processing apparatus according to claim 11, wherein the data amount reduction processing comprises processing the first information to generate first medium information that contains first voice information of the first user as acquired by the first electronic device and first feature information representative of a feature of the first user, wherein the first feature information is for modifying first display information to generate second display information, and the second display information and the first voice information are transmitted to the second electronic device, so as to output the second display information and the first voice information at the second electronic device.

19. The information processing apparatus according to claim 18, wherein the first display information is virtual display information of the first user and generated by steps of:

obtaining third display information, which is reference virtual display information;

obtaining adjustment information at the first electronic device, the adjustment information is generated by that the first electronic device detects a feature of the first user, or generated by that the first electronic device receives an instruction from the first user; and generating the first display information based on the third display information and the adjustment information.

20. The information processing apparatus according to claim 14, wherein:

if it is determined that a first data amount of the first information to be transmitted within a unit time period and a second data amount of update of the shared information is less than or equal to the bandwidth of the communication link indicated by the bandwidth information, then the processing unit determines that the preset data amount reduction condition is not satisfied, and data amount reduction processing is not performed on the first information and the update of the shared information; or if it is determined that a first data amount of the first information to be transmitted within a unit time period and a second data amount of update of the shared information is larger than the bandwidth of the communication link indicated by the bandwidth information, then the processing unit determines that the preset data amount reduction condition is satisfied, data amount reduction processing is performed on the first information.

* * * * *